United States Patent Office 2,975,143
Patented Mar. 14, 1961

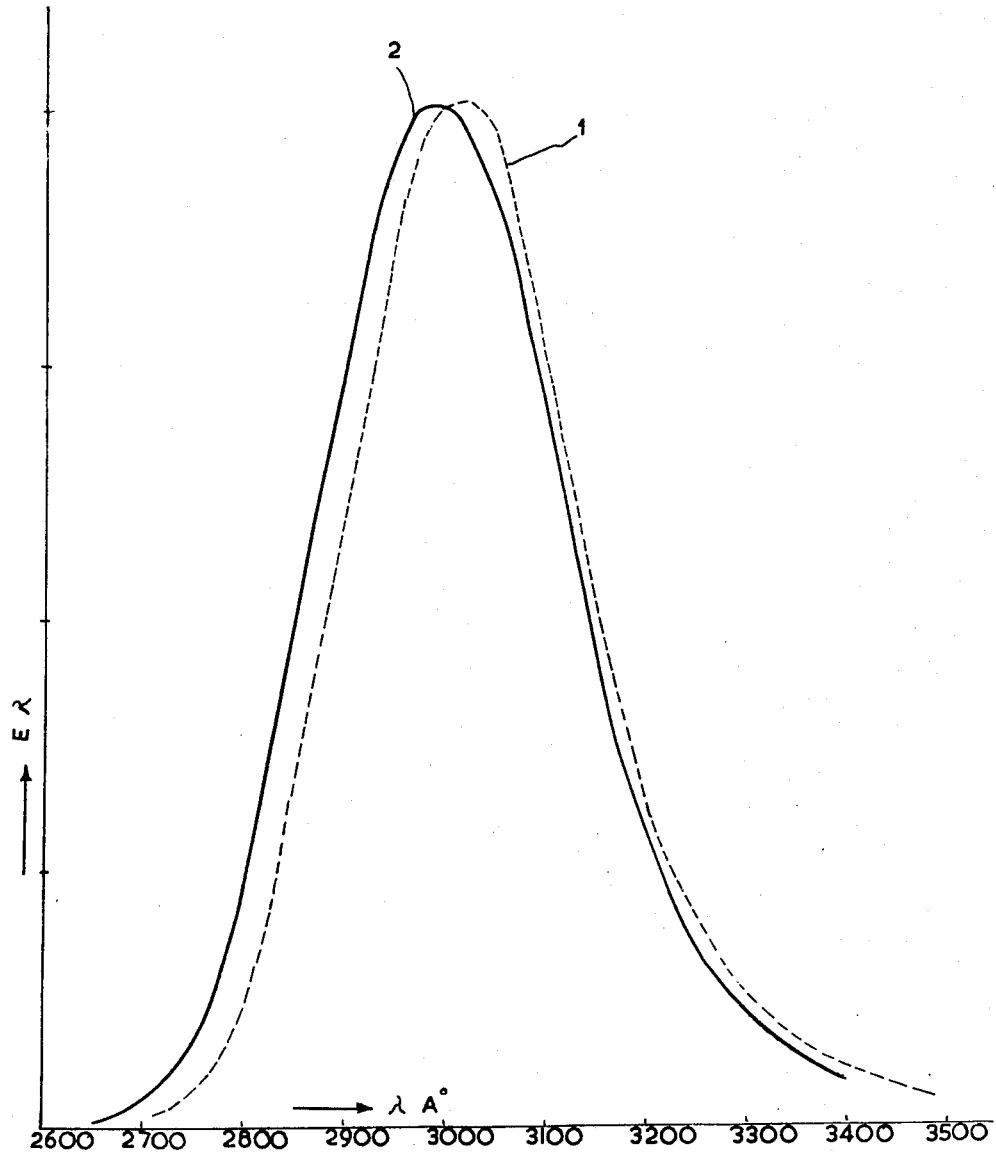

2,975,143
METHOD OF PRODUCING ULTRAVIOLET LUMINESCING SILICATES

Age Hylke Hoekstra, Eindhoven, Netherlands, assignor, by mesne assignments, to North American Philips Company, Inc., New York, N.Y., a corporation of Delaware Filed Sept. 18, 1956, Ser. No. 610,607
Claims priority, application Netherlands Oct. 3, 1955
7 Claims. (Cl. 252—301.6)

The invention relates to methods of producing silicates which, when irradiated by radiation produced in a gas- and/or vapour discharge tube, emit short-wave ultraviolet radiation. The invention also relates to silicates produced by such methods and to radiations sources comprising the combination of a gas- and/or vapour discharge tube and the said luminescent silicates.

It is well known that rays having a wave-length between 2900 A. and 3000 A. have a beneficial influence on human beings and animals. This radiation is frequently referred to as erythemal radiation. Consequently, radiation sources have been built which emit this radiation with sufficient intensity. A known radiation source of this kind comprises the combination of a gas- and/or vapour discharge tube, more particularly a mercury-vapour discharge tube, and a screen coated with luminescent materials which can be excited by the radiation produced by the discharge to emit erythemal radiation. The number of luminescent substances suiting this purpose is not very great, particularly if the requirement is to be satisfied that the conversion should be effected with satisfactory efficiency.

Cerium-activated compounds are known which can be excited by radiation of a wave-length of less than 2900 A. to emit erythemal radiation, however, they have a limitation in that, when they are used in a discharge tube, their conversion efficiency is satisfactory for a comparatively short period of time only.

One of the substances best suiting the above-mentioned purpose is a thallium-activated orthophosphate of calcium and zinc. Another reasonably satisfactory substance for this purpose is a thallium-activated orthophosphate of calcium and magnesium.

In a co-pending application Serial No. 508,982, filed May 17, 1955, now U.S. Patent 2,846,403, methods have been described of producing another substance which is highly suited to the conversion of short-wave ultraviolet radiation into erythemal radiation. This substance is a lead-activated barium-zinc-silicate which is produced by heating a mixture of compounds of barium, zinc, silicon and lead, which mixture on heating produces lead-activated barium-zinc silicate, in a non-reducing atmosphere to a temperature between 900° C. and 1100° C., for some hours. In producing this substance, as the initial material use is made of such amounts of the compounds that the proportion of the said elements in said mixture satisfy the following atomic ratio conditions:

$$\frac{Ba}{Ba+Zn+Si}$$

lies between 0.05 and 0.25, $$\frac{Zn}{Ba+Zn+Si}$$

lies between 0.15 and 0.45, $$\frac{Si}{Ba+Zn+Si}$$

lies between 0.40 and 0.80, $$\frac{Pb}{Ba+Zn+Si}$$

lies between $5 \times 10^{-2}$ and $10^{-6}$.

The substances thus produced can be used in combination with a low-pressure mercury-vapour discharge tube, since the discharge of such a tube emits a high amount of radiation of a wave-length of 2537 A. which is converted into the erythemal radiation with satisfactory efficiency.

As has also been described in this co-pending application of prior date, the luminescent substances thus produced offer the advantage over the known thallium-activated luminescent substances emitting erythemal radiation that their production is simple since the activator is less volatile and less poisonous than the thallium.

In this co-pending application of prior date it is stated that a preferred ratio is obtained, if:

$$\frac{Ba}{Ba+Zn+Si}$$

lies between 0.10 and 0.17, $$\frac{Zn}{Ba+Zn+Si}$$

lies between 0.30 and 0.45, $$\frac{Si}{Ba+Zn+Si}$$

lies between 0.42 and 0.60, $$\frac{Pb}{Ba+Zn+Si}$$

lies between $5 \times 10^{-2}$ and $10^{-6}$.

Continued tests of the luminescent products produced with the use of methods described in this co-pending application of prior date have shown that these substances exhibit, in addition to the above-mentioned satisfactory properties, a property which is undesirable for mass production, by the usual methods, of radiation sources comprising a gas- and/or vapour discharge tube and a layer of such a luminescent substance which is coated on the inner wall of the tube.

As is well known, in the manufacture of such a radiation source, the luminescent substance is usually applied to the wall of the discharge vessel in that the substance is suspended in a liquid containing a binding agent, after which the suspension is introduced into the discharge vessel, for example by raising it in the tube. Subsequently the suspension is drained off from the discharge vessel, a layer consisting of the luminescent substance and the binding agent adhering to the wall. Subsequently the discharge tube is dried and the binding agent, generally nitrocellulose, is evaporated and/or burnt by heating in a furnace. The luminescent substance adheres to the wall due to van der Waal's forces.

In carrying out this normal method of coating, it was found that the substances described in the above-mentioned application of prior date produced an unsatisfactory coating. When the binding agent was removed by burning, a comparatively large portion of the luminescent powder became detached. When the electrodes were subsequently mounted, in which process at least part of the tube is again heated to a high temperature, another part of the luminescent powder became detached. Consequently, in spite of the favourable luminous properties of these luminescent substances, their use in manufacturing radiation sources presented great difficulty.

It is an object of the present invention to provide a method of producing a luminescent substance which exhibits the favourable luminous properties of the substances produced by the method described in the prior application, but does not become detached in the process of manufacturing a discharge tube in which it is used.

According to the invention, in a method of producing a silicate which, when irradiated by the radiation produced in a gas- and/or vapour discharge tube, emits shortwave ultra-violet radiation, a mixture of compounds of barium, zinc, magnesium, silicon and lead, which mixture on heating produces a lead-activated barium-magnesium-zinc silicate, and in which mixture the proportion of the said elements are such that they satisfy the following atomic ratio conditions:

$$\frac{Ba}{Ba+Zn+Mg+Si}$$

lies between 0.05 and 0.25, $$\frac{Zn+Mg}{Ba+Zn+Mg+Si}$$

lies between 0.15 and 0.45, $$\frac{Zn}{Mg}$$

lies between 33 and 3, $$\frac{Si}{Ba+Zn+Mg+Si}$$

lies between 0.40 and 0.80, $$\frac{Pb}{Ba+Zn+Mg+Si}$$

lies between $5 \times 10^{-2}$ and $10^{-6}$, is heated for a few hours in a non-reducing atmosphere to a temperature between 900° C. and 1100° C.

Substances produced by this method exhibit all the satisfactory luminous properties of the substances in accordance with the above-mentioned prior application, however, in addition it is found that they do not become detached from the wall of the discharge tube when they are introduced into this tube in a usual manner and the binding agent is removed by heating.

In order to provide a better understanding of this phenomenon, a differential thermal analysis was carried out of a number of compounds both with and without the inclusion of magnesium. The curves obtained proved that for preparations containing no magnesium there is a transition point at about 273° C.

When the magnesium content is gradually increased the molecular sum total of zinc and magnesium being kept constant, the transition point is shifted to higher temperatures and finally is no longer perceptible. Experiments in manufacturing discharge tubes have shown that the improvement of the adherence corresponds with the shifting and disappearance of the transition point.

The best products are obtained, if in the production in accordance with the invention, the atomic ratios are so chosen that:

$$\frac{Ba}{Ba+Zn+Mg+Si}$$

lies between 0.15 and 0.20, $$\frac{Zn+Mg}{Ba+Zn+Mg+Si}$$

lies between 0.30 and 0.42, $$\frac{Zn}{Mg}$$

lies between 33 and 3, $$\frac{Si}{Ba+Zn+Mg+Si}$$

lies between 0.42 and 0.60, $$\frac{Pb}{Ba+Zn+Mg+Si}$$

lies between $5 \times 10^{-2}$ and $10^{-6}$.

In addition to the material improvement of the adherence, the substitution of magnesium for a part of the zinc provides some other advantages. When from 3 to 8 mol. percent of zinc are replaced by magnesium, the quantum efficiency proves to increase by from 3 to 6%. When more than 8 mol. percent of zinc are replaced by magnesium, the quantum efficiency is slowly decreased and, when more than about 12 mol. percent of zinc are replaced, the quantum efficiency even falls slightly below the quantum efficiency of the compounds containing no magnesium. However, in this case there is a slight shift in the direction of shorter wave-lengths instead. The maximum emission, which initially was between 3000 A. and 3100 A. for the lower lead-contents and between 3000 A. and 3500 A. for the higher lead-contents, consequently shifts in the direction of the maximum of the erythemal sensitivity curve which, as is well known, lies at about 2970 A.

In a method in accordance with the invention, very suitable initial compounds comprise oxides, nitrates and carbonates of barium, zinc, magnesium or lead. The silicon is preferably added as an oxide. Mixtures of these compounds are also very suitable. The lead or the barium may also be added with advantage as fluorides, of which part also acts as a flux. Thus the production temperature is reduced and the crystallisation is promoted.

A few examples of production methods will now be described with reference to the drawing which shows some curves which, in units chosen at random, show the relationship between the wave-lengths of the emitted radiation and its intensity. All the curves have been taken with excitation by radiation having a wave-length of 2537 A.

*Example I*

| | |
|---|---|
| 12.35 gms. of $BaCO_3$ | 0.70 gms. of MgO |
| 12.73 gms. of ZnO | 15.8 gms. of $SiO_2$ | are mixed; the mixture is suspended in from 150 ccs. to 250 ccs. of alcohol and ground in a ball-mill for 16 hours after the addition of 25 ccs. of an aqueous solution of $Pb(NO_3)_2$ in a concentration of $10^{-4}$ gram-molecule of Pb per cc. The suspension produced is dried by evaporation and the dry product is pulverized in a mortar, after which the powder is heated in a quartz crucible to a temperature of 700° C. in air in a furnace for 2 hours. After the crucible and its contents have been cooled in the furnace, the reaction product is again ground in a mortar. The powder produced is again heated in a furnace to a temperature of 1010° C. for 4 hours. This heat treatment is effected in a quartz crucible with closed cover. The crucible and its contents are subsequently cooled to room temperature. The product obtained is again ground and sieved. The spectral distribution is shown by curve 1 in the drawing. The quantum efficiency of the radiation emitted is substantially equal to that of a substance produced by a similar method but in which the MgO is replaced by an equivalent amount of ZnO.

*Example II*

| | |
|---|---|
| 35.14 gms. of $BaCO_3$ | 25.24 gms. of $SiO_2$ |
| 29.30 gms. of ZnO | 0.35 gms. of $BaF_2$ |
| 1.61 gms. of MgO | 1.12 gms. of PbO | are mixed. This mixture is mixed dry in a ball-mill for three hours, subsequently fired for about three hours at a temperature of about 1000° C. in air and then ground again. The ground product obtained is again heated in air to a temperature of 1000° C. for 1 hour. The luminescent substance produced has a spectral distribution which substantially coincides with that of the product obtained by the method described in Example I, the quantum efficiency also being substantially equal.

Example III 35.14 gms. of $BaCO_3$      25.24 gms. of $SiO_2$
26.04 gms. of ZnO           0.35 gms. of $BaF_2$
3.22 gms. of MgO            1.12 gms. of PbO are mixed. This mixture is ground and fired in a manner identical to that described in Example I. The spectral distribution of the luminescence light is shown by the curve 2 in the drawing. The quantum efficiency of the radiation emitted is less by about 3% than that of the corresponding material in which the MgO is replaced by an equivalent amount of ZnO.

Example IV 26.14 g. $Ba(NO_3)_2$       36.00 g. $SiO_2$
22.71 g. ZnO                0.70 g. $PbF_2$
0.60 g. MgO are mixed and ground in a mortar. The powder obtained is heated in an alundum crucible in a furnace to 950° C. in air for 1 hour. The product is again ground in a mortar and heated in an alundum crucible in a furnace to 1050° C. in air for 1 hour. The crucible and its contents are cooled to room temperature in the furnace. The spectral distribution is substantially equal to that of a substance produced by the method described in Example I. The quantum efficiency of the radiation is higher by about 6% than that of the corresponding substance in which the MgO is replaced by an equivalent amount of ZnO.

The luminescent substances produced by a method as described in any of the above examples can be applied in normal known manners as a luminescent layer to the inner wall of a glass envelope of a gas- and/or vapour-discharge tube. As a binding agent use can be made of nitrocellulose, methyl-methacrylate, ammonium-alginate or similar substances, with the use of a suitable solvent, for example butyl-acetate.

What is claimed is:

1. An erythemal phosphor emitting ultraviolet radiation of a wave length of about 2900 A. to 3000 A. in response to ultraviolet radiation having a wave length of about 2537 A. and consisting essentially of a lead activated barium-magnesium-zinc silicate in which the elements satisfy the following atomic ratio conditions:

$$\frac{Ba}{Ba+Zn+Mg+Si}$$

lies between 0.05 and 0.25, $$\frac{Zn+Mg}{Ba+Zn+Mg+Si}$$

lies between 0.15 and 0.45, $$\frac{Zn}{Mg}$$

lies between 33 and 3, $$\frac{Si}{Ba+Zn+Mg+Si}$$

lies between 0.40 and 0.80, and $$\frac{Pb}{Ba+Zn+Mg+Si}$$

lies between $5 \times 10^{-2}$ and $10^{-6}$.

2. An erythemal phosphor emitting ultraviolet radiation of a wave length of about 2900 A. to 3000 A. in response to ultraviolet radiation having a wave length of about 2537 A. and consisting essentially of a lead activated barium-magnesium-zinc silicate in which the elements satisfy the following atomic ratio conditions:

$$\frac{Ba}{Ba+Zn+Mg+Si}$$

lies between 0.15 and 0.20, $$\frac{Zn+Mg}{Ba+Zn+Mg+Si}$$

lies between 0.30 and 0.42, $$\frac{Zn}{Mg}$$

lies between 33 and 3, $$\frac{Si}{Ba+Zn+Mg+Si}$$

lies between 0.42 and 0.60, and $$\frac{Pb}{Ba+Zn+Mg+Si}$$

lies between $5 \times 10^{-2}$ and $10^{-6}$.

3. The method of producing an erythemal phosphor emitting ultraviolet radiation in a wave length of about 2900 A. to 3000 A. in response to ultraviolet radiation having a wave length of about 2537 A. comprising the steps, forming a mixture of barium, magnesium, zinc, silicon and lead compounds in proportions which upon heating forms a lead activated barium-magnesium zinc-silicate in which the elements satisfy the following atomic ratio conditions:

$$\frac{Ba}{Ba+Zn+Mg+Si}$$

lies between about 0.05 and 0.25, $$\frac{Zn+Mg}{Ba+Zn+Mg+Si}$$

lies between about 0.15 and 0.45, $$\frac{Zn}{Mg}$$

lies between about 33 and 3, $$\frac{Si}{Ba+Zn+Mg+Si}$$

lies between about 0.40 and 0.80, and $$\frac{Pb}{Ba+Zn+Mg+Si}$$

lies between about $5 \times 10^{-2}$ and $10^{-6}$.

and heating said mixture in a non-reducing atmosphere at a temperature between about 900° C. and 1100° C. for several hours.

4. The method of producing an erythemal phosphor emitting ultraviolet radiation in a wave length of about 2900 A. to 3000 A. in response to ultraviolet radiation having a wave length of about 2537 A. comprising the steps, forming a mixture of barium, magnesium, zinc, silicon and lead compounds in proportions which upon heating forms a lead activated barium-magnesium zinc-silicate in which the elements satisfy the following atomic ratio conditions:

$$\frac{Ba}{Ba+Zn+Mg+Si}$$

lies between about 0.15 and 0.20, $$\frac{Zn+Mg}{Ba+Zn+Mg+Si}$$

lies between about 0.30 and 0.42, $$\frac{Zn}{Mg}$$

lies between about 33 and 3, $$\frac{Si}{Ba+Zn+Mg+Si}$$

lies between about 0.42 and 0.60, and $$\frac{Pb}{Ba+Zn+Mg+Si}$$

lies between about $5\times 10^{-2}$ and $10^{-6}$.

and heating said mixture in a non-reducing atmosphere at a temperature between about 900° and 1100° C. for several hours.

5. The method of claim 4 in which at least one of the compounds used is an oxide.

6. The method of claim 4 in which the barium compound is a barium fluoride.

7. The method of claim 4 in which the lead compound is a lead fluoride.

References Cited in the file of this patent

UNITED STATES PATENTS

| | | |
|---|---|---|
| 2,314,699 | Hale | Mar. 23, 1943 |
| 2,499,307 | Ginther | Feb. 28, 1950 |
| 2,540,804 | Anderson et al. | Feb. 6, 1951 |
| 2,628,944 | Nagy | Feb. 17, 1953 |
| 2,846,403 | Hoekstra et al. | Aug. 5, 1958 |

OTHER REFERENCES

Butler: J. Electrochem. Soc. March 1950, vol. 97, No. 3, pages 83–91.